No. 636,612. Patented Nov. 7, 1899.
L. A. ASPINWALL.
CHURN.
(Application filed Aug. 23, 1899.)

(No Model.)

Witnesses:
J. Staib
Chas H. Smith

Inventor
Lewis Augustus Aspinwall
per L. W. Serrell & Son
attys

THE NORRIS PETERS CO., PHOTO-LITHO., WASHINGTON, D. C.

UNITED STATES PATENT OFFICE.

LEWIS AUGS. ASPINWALL, OF JACKSON, MICHIGAN, ASSIGNOR TO THE ASPINWALL MANUFACTURING COMPANY, OF SAME PLACE.

CHURN.

SPECIFICATION forming part of Letters Patent No. 636,612, dated November 7, 1899.

Application filed August 23, 1899. Serial No. 728,168. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Churns, of which the following is a specification.

My invention relates to that form of churn known on the market as the "barrel-churn." Heretofore these churns have usually been mounted in fixed trunnions and have been rotated by a moving arm and crank; but only a rotary motion has been imparted to said churns.

The object of my invention is to impart to the churn, besides the rotary motion, an oscillating motion.

In carrying out my invention I provide a frame forming a platform, upon which the operator stands, and to this platform is pivoted a rocking frame, the barrel-churn being pivoted about midway of said frame upon trunnions with which cranks are formed. Pitman-bars, which are also pivoted to the platform at one end, are connected to the cranks at their other ends. The upper end of the rocking frame serves as a handle, and it is pivoted to the platform at its other end. As the operator, standing upon the platform, grasps the handle of the rocking frame and moves the same back and forth the cranks are turned by the action of the pitman-bars and the barrel-churn is given a rotary movement and by the rocking motion of the frame an oscillating movement.

Figure 1:
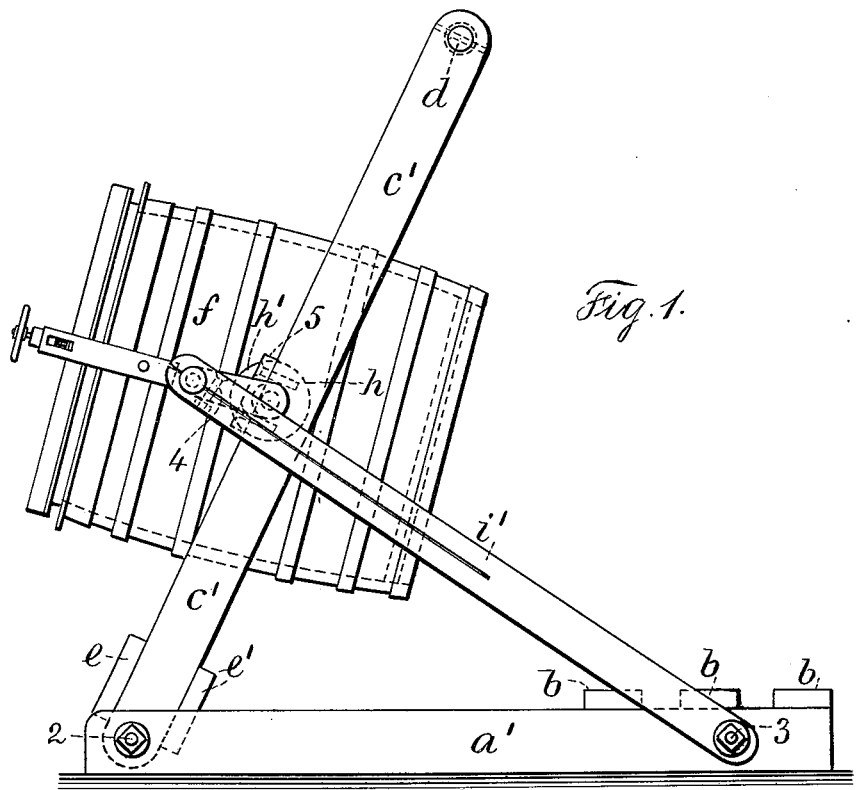
Figure 2:
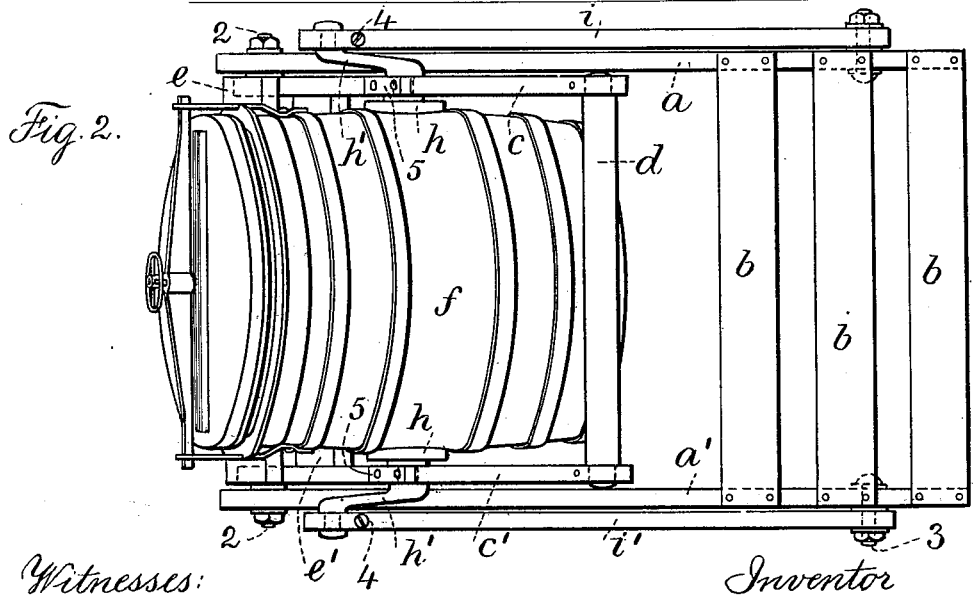

In the drawings, Figure 1 is a side elevation, and Fig. 2 a plan, representing my improvement.

The platform is composed of the parallel bars $a$ $a'$, connected at one end by the series of cross-strips $b$, which serve as a support for the operator to stand upon. The oscillating frame is composed of the parallel bars $c$ $c'$, pivoted at 2 to the bars $a$ $a'$, and they are connected at their upper ends by a handle $d$. Brace-rods $e$ $e'$ are connected to the parallel bars $c$ $c'$ adjacent to the pivots 2. These bars serve as a brace to the oscillating frame and in connection with the pivot-bolts 2 maintain a fixed relation to the bars $a$ $a'$ at their free ends, because said bars are held by the series of cross-strips rigidly together at their other ends.

The barrel $f$, which is of usual character and the structure of which forms no part of my invention, is provided with trunnions $h$, having cranks $h'$. The trunnions are pivoted about midway to the bars $c$ $c'$ by notching the edges of said bars and providing a cover-plate 5 over the said trunnions and notches of the bars $c$ $c'$. The pitman-bars $i$ $i'$ are pivoted by the bolts 3 to the bars $a$ $a'$ adjacent to the series of cross-strips $b$, and the other ends of the pitman-bars $i$ $i'$ are preferably split and provided with holes for the ends of the cranks $h'$, the split ends being held together by screw-bolts 4 in a manner usual in machines made of wood with bearings in the wood. The bars $c$ $c'$ rock on the pivot-bolts 2 and the pitman-bars $i$ $i'$ on the pivot-bolts 3, the operator standing upon the series of cross-strips and grasping the handle $d$ to effect these movements and at the same time rotating the barrel by the cranks $h'$ and imparting an oscillating motion to the barrel, and thereby agitating the contents more effectively.

The construction of my improvement is such that the pivot-bolts 3 can be removed and the parts folded down into a compact and convenient knockdown condition for transportation.

I claim as my invention—

1. The combination with the barrel-churn and a platform, of a hand-operated oscillating frame pivoted to the platform and to which the barrel is pivotally connected, trunnions for pivotally supporting the barrel-churn and cranks connected therewith and pitman-bars also pivoted to the platform at one end and to the cranks at their other ends for imparting to the barrel-churn both a rotary and oscillating movement, substantially as set forth.

2. The combination with the barrel-churn and a platform, of a hand-operated oscillating frame pivoted to the platform at one end and having a handle at the other end, trunnions connected to the barrel and pivoted in the oscillating frame about midway and having cranks connected to said trunnions, pitman-bars pivoted to said platform at one end and connected to the cranks at the other end for imparting a rotary and oscillating movement to the churn, substantially as set forth.

3. The combination with the barrel-churn and the trunnions and cranks connected therewith, of a platform comprising parallel bars connected at one end by a series of cross-strips, an oscillating frame composed of parallel bars, a handle connecting the same at the upper end and pivot-bolts connecting the same at their lower ends to the parallel bars of the platform, and brace-bars between the lower ends of the parallel bars of the oscillating frame, pitman-bars pivoted at one end to the opposite end of the parallel bars of the platform and adjacent to the series of connecting-strips, said pitman-bars being split at their free ends and provided with bearings engaging the cranks and screw-bolts for clamping the same, substantially as and for the purposes set forth.

Signed by me this 18th day of August, 1899.

L. AUGS. ASPINWALL.

Witnesses:
E. L. ROSE,
W. C. SHANOFELT.